US011238485B2

(12) United States Patent
Park (10) Patent No.: US 11,238,485 B2
(45) Date of Patent: Feb. 1, 2022

(54) METHOD AND DEVICE FOR PROVIDING DIGITAL GOODS USING URL COUPON

(71) Applicant: n-tuple.co.ltd, Seoul (KR)

(72) Inventor: Hyun-Min Park, Seoul (KR)

(73) Assignee: n-tuple.co.ltd, Seoul (KR)

( * ) Notice: Subject to any disclaimer, the term of this patent is extended or adjusted under 35 U.S.C. 154(b) by 32 days.

(21) Appl. No.: 14/941,515

(22) Filed: Nov. 13, 2015

(65) Prior Publication Data

US 2016/0210654 A1 Jul. 21, 2016

(30) Foreign Application Priority Data

Jan. 19, 2015 (KR) .................. 10-2015-0008739

(51) Int. Cl.
*G06Q 30/02* (2012.01)
*G06Q 20/38* (2012.01)

(52) U.S. Cl.
CPC ....... *G06Q 30/0239* (2013.01); *G06Q 20/382* (2013.01); *G06Q 20/387* (2013.01); *G06Q 2220/00* (2013.01)

(58) Field of Classification Search
CPC ......... G06Q 30/00; G06Q 30/02; G06Q 40/10
USPC ............................... 705/14.13, 14.26, 14.66
See application file for complete search history.

(56) References Cited

U.S. PATENT DOCUMENTS

| | | | | |
|---|---|---|---|---|
| 2004/0249712 A1* | 12/2004 | Brown | ............... | G06Q 30/0217 705/14.19 |
| 2007/0038567 A1* | 2/2007 | Allaire | ................. | H04N 21/812 705/50 |
| 2010/0185504 A1* | 7/2010 | Rajan | ................. | G06Q 30/0242 705/14.13 |
| 2012/0209686 A1* | 8/2012 | Horowitz | ............. | G06K 7/1417 705/14.26 |
| 2012/0262211 A1* | 10/2012 | Llewellyn | ............... | H03F 3/217 327/172 |

(Continued)

FOREIGN PATENT DOCUMENTS

JP 2012-027740 2/2012
KR 10-2005-0028090 4/2005

(Continued)

OTHER PUBLICATIONS

English Language and Machine translation of KR 20-2014-0000652U published on Feb. 3, 2014.

(Continued)

*Primary Examiner* — John W Hayes
*Assistant Examiner* — Nakia Leffall-Allen
(74) *Attorney, Agent, or Firm* — Novick, Kim & Lee, PLLC; Sang Ho Lee (57) ABSTRACT

The present disclosure pertains to a method for providing digital goods using a URL coupon. The method includes: generating a digital goods provision URL containing information on digital goods; generating a URL coupon containing the digital goods provision URL; providing the URL coupon; receiving a digital goods provision request at the digital goods provision URL; authenticating a user; and transmitting an information processing request containing authenticated user information and digital goods identification information to a digital goods managing server. The method makes it possible to provide digital goods in an easy and safe manner.

6 Claims, 4 Drawing Sheets

(56) References Cited

U.S. PATENT DOCUMENTS

| | | | | |
|---|---|---|---|---|
| 2012/0284017 A1* | 11/2012 | Begeja | ............... | H04L 51/04 |
| | | | | 704/9 |
| 2013/0030901 A1* | 1/2013 | Eichstaedt | ......... | G06Q 30/0217 |
| | | | | 705/14.26 |
| 2014/0180826 A1* | 6/2014 | Boal | ............. | G06Q 30/0207 |
| | | | | 705/14.66 |
| 2015/0112790 A1* | 4/2015 | Wolinsky | ............. | G06Q 20/32 |
| | | | | 705/14.38 |

FOREIGN PATENT DOCUMENTS

| | | |
|---|---|---|
| KR | 10-0785275 | 12/2007 |
| KR | 10-2008-0127576 | 12/2008 |
| KR | 10-2009-0087971 | 9/2009 |
| KR | 10-1351995 | 1/2014 |
| KR | 20-2014-0000652 U | 2/2014 |
| KR | 10-142896 | 8/2014 |
| KR | 10-1428960 | 8/2014 |

OTHER PUBLICATIONS

English Language and Machine translation of KR 10-1428960 published on Aug. 4, 2014.

English Language Abstract and Translation for JP 2012-027740 published Feb. 9, 2012.

English Language Translation for KR 10-142896 published Aug. 4, 2014.

English Language Translation for KR 10-2008-0127576 published Dec. 16, 2008.

English Language Translation for KR 10-0785275 published Dec. 6, 2007.

English Language Translation for KR 10-2005-0028090 published Apr. 4, 2005.

English Language Translation for KR 10-2009-0087971 published Sep. 17, 2009.

English Language Translation for KR 10-0351995 published Jan. 9, 2014.

\* cited by examiner

METHOD AND DEVICE FOR PROVIDING DIGITAL GOODS USING URL COUPON

CROSS-REFERENCE TO RELATED APPLICATION(S)

This application is based on and claims priority from Korean Patent Application No. 10-2015-0008739, filed on Jan. 19, 2015 with the Korean Intellectual Properly Office, the disclosure of which is incorporated herein in its entirely by reference.

TECHNICAL FIELD

The present disclosure relates to method and device for providing digital goods using uniform resource locator (URL) coupon.

BACKGROUND

Coupon for providing digital goods has appeared along with the development of electronic commerce. Typically, a coupon issuer provides a coupon code to a user, and the user manually inputs the coupon code to a system of the coupon issuer. The conventional digital goods coupon is quite inconvenient to issue, manage, and use, and is low in security. Thus, demand has existed for an easy-to-use and secure coupon.

OVERVIEW OF CERTAIN ASPECTS

In order to solve the aforementioned problem, the present disclosure provides a method and device for providing digital goods using a URL coupon.

According to one embodiment of the present disclosure, there is provided a device including: a communication unit configured to transmit and receive data; and a control unit configured to generate a digital goods provision URL containing information on digital goods, generate a URL coupon containing the digital goods provision URL, provide the URL coupon, receive a digital goods provision request via the communication unit at the digital goods provision URL, authenticate a user, and transmit an information processing request containing authenticated user information and digital goods identification information to a digital goods managing server via the communication unit.

According to another embodiment of the present disclosure, there is provided a device including: a communication unit configured to transmit and receive data; and a control unit configured to generate a digital goods provision URL containing information on digital goods, generate a URL coupon containing the digital goods provision URL, provide the URL coupon, receive a digital goods provision request via the communication unit at the digital goods provision URL, and provide the digital goods in response to the digital goods provision request.

According to a further embodiment of the present disclosure, there is provided a device including: a communication unit configured to transmit and receive data; and a control unit configured to generate a URL coupon issuance URL containing information on digital goods, receive a coupon issuance request via the communication unit at the URL coupon issuance URL, transmit a URL coupon corresponding to the coupon issuance request via the communication unit, receive a digital goods provision request via the communication unit at a digital goods provision URL contained in the URL coupon, authenticate a user, and transmit an information processing request containing authenticated user information and digital goods identification information to a digital goods managing server via the communication unit.

According to a further embodiment of the present disclosure, there is provided a device including: a communication unit configured to transmit and receive data; and a control unit configured to generate a URL coupon issuance URL containing information on digital goods, receive a coupon issuance request via the communication unit at the URL coupon issuance URL, transmit a URL coupon corresponding to the coupon issuance request via the communication unit, receive a digital goods provision request via the communication unit at a digital goods provision URL contained in the URL coupon, and provide the digital goods in response to the digital goods provision request.

According to a further embodiment of the present disclosure, there is provided a device including: a communication unit configured to transmit and receive data; and a control unit configured to store a URL coupon issuance URL containing information on digital goods, receive a URL coupon provision request from a user, transmit a coupon issuance request to the URL coupon issuance URL via the communication unit, receive a URL coupon containing a digital goods provision URL corresponding to the coupon issuance request via the communication unit, and provide the URL coupon to the user.

The control unit may be configured to store identification information of the URL coupon, compare the received digital goods provision request with the stored identification information of the URL coupon, and determine whether the received digital goods provision request is a normal request.

The control unit may be configured to determine whether the coupon issuance request is received from a predefined URL.

The control unit may be configured to, upon receiving the coupon issuance request, generate the URL coupon in real time.

The control unit may be configured to perform the user authentication using a user ID of a social network service.

The information contained in the URL coupon may be encrypted by an encryption algorithm.

The information contained in the URL coupon issuance URL may be encrypted by an encryption algorithm.

The URL coupon may be a markup language element containing the digital goods provision URL.

The URL coupon may be a usage number limiting URL coupon by which the digital goods can be provided a predetermined number of times.

The URL coupon may be a period limiting URL coupon by which the digital goods can be provided for a predetermined time period.

The URL coupon may be an unlimited URL coupon by which the digital goods can be provided without limitation.

According to a further embodiment of the present disclosure, there is provided a communication system including a first server and a second server, wherein the first server includes a first communication unit configured to transmit and receive data, and a first control unit configured to generate a digital goods provision URL containing information on digital goods, generate a URL coupon containing the digital goods provision URL, provide the URL coupon, receive a digital goods provision request via the first communication unit at the digital goods provision URL, authenticate a user, and transmit an information processing request containing authenticated user information and digital goods identification information to the second server via the first communication unit, and the second server includes a second communication unit configured to transmit and receive data, and a second control unit configured to receive the information processing request and provide the digital goods to the authenticated user.

According to a further embodiment of the present disclosure, there is provided a communication system including a first server and a second server, wherein the first server includes a first communication unit configured to transmit and receive data, and a first control unit configured to generate a URL coupon issuance URL containing information on digital goods, receive a coupon issuance request from the second server via the first communication unit at the URL coupon issuance URL, transmit a URL coupon corresponding to the coupon issuance request to the second server via the first communication unit, receive a digital goods provision request via the first communication unit at a digital goods provision URL contained in the URL coupon, authenticate a user, and perform processing corresponding to the digital goods provision request and the authenticated user, and the second server includes a second communication unit configured to transmit and receive data, and a second control unit configured to store the URL coupon issuance URL, receive a URL coupon provision request from the user via the second communication unit, transmit a coupon issuance request to the first server via the second communication unit at the URL coupon issuance URL, receive the URL coupon from the first server via the second communication unit, and provide the URL coupon to the user.

According to a further embodiment of the present disclosure, there is provided a method including: generating a digital goods provision URL containing information on digital goods; generating a URL coupon containing the digital goods provision URL; providing the URL coupon; receiving a digital goods provision request at the digital goods provision URL; authenticating a user; and transmitting an information processing request containing authenticated user information and digital goods identification information to a digital goods managing server.

According to a further embodiment of the present disclosure, there is provided a method including: generating a digital goods provision URL containing information on digital goods; generating a URL coupon containing the digital goods provision URL; providing the URL coupon; receiving a digital goods provision request at the digital goods provision URL; and providing the digital goods in response to the digital goods provision request.

According to a further embodiment of the present disclosure, there is provided a method including: generating a URL coupon issuance URL containing information on digital goods; receiving a coupon issuance request at the URL coupon issuance URL; transmitting a URL coupon corresponding to the coupon issuance request; receiving a digital goods provision request at a digital goods provision URL contained in the URL coupon; authenticating a user; and transmitting an information processing request containing authenticated user information and digital goods identification information to a digital goods managing server.

According to a further embodiment of the present disclosure, there is provided a method including: generating a URL coupon issuance URL containing information on digital goods; receiving a coupon issuance request at the URL coupon issuance URL; transmitting a URL coupon corresponding to the coupon issuance request; receiving a digital goods provision request at a digital goods provision URL contained in the URL coupon; and providing the digital goods in response to the digital goods provision request.

According to a further embodiment of the present disclosure, there is provided a method including: storing a URL coupon issuance URL containing information on digital goods; receiving a URL coupon provision request from a user; transmitting a coupon issuance request to the URL coupon issuance URL; receiving a URL coupon containing a digital goods provision URL corresponding to the coupon issuance request; and providing the URL coupon to the user.

According to a further embodiment of the present disclosure, there is provided a computer-readable recording medium which records a program for performing the method described above.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION OF ILLUSTRATIVE IMPLEMENTATIONS

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Preferred embodiments of the present disclosure will now be described in detail with reference to the accompanying drawings in order to make clear the technical idea of the present disclosure. In describing the present disclosure, if it is determined that the specific descriptions on functions or components known in the related art may unnecessarily make obscure the spirit of the present disclosure, the detailed descriptions thereof will be omitted. Components having substantially identical functions and configurations will be designated by like reference numerals and symbols as far as possible, even if the components are illustrated in different drawings. If necessary for the sake of convenience in description, a device and a method will be described together.

Figure 1:
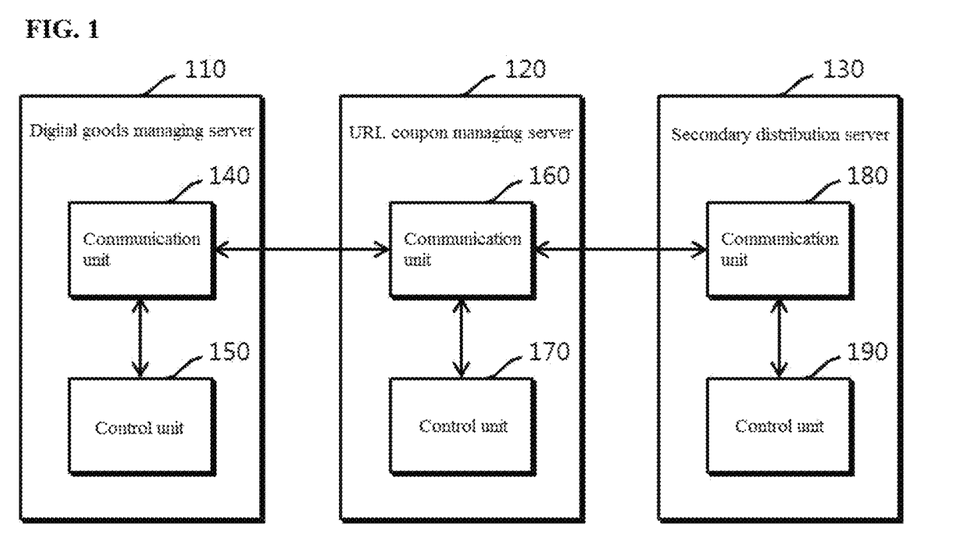
FIG. 1 is a view schematically illustrating the configuration of a system for providing digital goods using a URL coupon according to an embodiment of the present disclosure.

FIG. 1 is a view schematically illustrating the configuration of a system for providing digital goods using a URL coupon according to an embodiment of the present disclosure. Referring to FIG. 1, the system for providing digital goods using a URL coupon according to an embodiment of the present disclosure includes a digital goods managing server 110, a URL coupon managing server 120 and a secondary distribution server 130, which are capable of communicating with one another. These servers may be operated by the same business entity or different business entities. The digital goods managing server 110 includes a communication unit 140 and a control unit 150. The URL coupon managing server 120 includes a communication unit 160 and a control unit 170. The secondary distribution server 130 includes a communication unit 180 and a control unit 100. The respective communication units are configured to transmit and receive data. The respective control units are configured to process the data transmitted and received via the respective communication units. Detailed operations thereof will be described below with reference to FIGS. 2 and 3.

Figure 2:
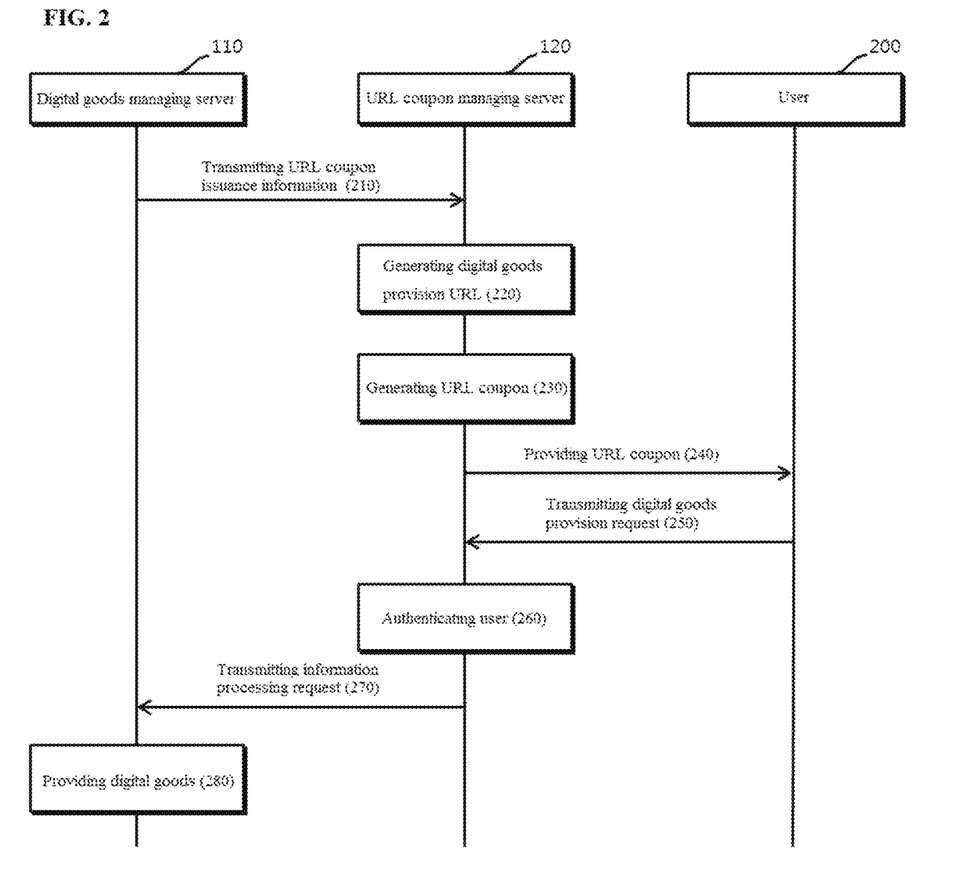
FIG. 2 is a sequence diagram schematically illustrating the flow of a method for providing digital goods using a URL coupon according to an embodiment of the present disclosure.

FIG. 2 is a sequence diagram schematically illustrating the flow of a method for providing digital goods using a URL coupon according to one embodiment of the present disclosure. FIG. 2 is directed to a case where the URL coupon managing server 120 directly provides a URL coupon to a user without a secondary distributor. Referring to FIG. 2, the digital goods managing server 110 delivers URL coupon issuance information to the URL coupon managing server 120 (Step 210). The URL coupon issuance information is the information used in issuing a URL coupon. For example, the URL coupon issuance information may include identification information of a company operating the digital goods managing server, identification information of an application related to the digital goods, a name of the URL coupon, a network address of an image indicating the URL coupon, a type of the URL coupon, identification information of the digital goods, a network address of an image indicating the digital goods, a name of the digital goods, a detailed description on the digital goods, the number of the digital goods, and so forth. The term "digital goods" used herein may include not only digital contents such as digital media, electronic books, and game items, but also digital subscriptions, discount coupons, free shipping coupons, and so forth. Examples of the type of the URL coupon may include a usage number limiting URL coupon by which digital goods can be provided a predetermined number of times, a period limiting URL coupon by which digital goods can be provided for a predetermined time period, and an unlimited URL coupon by which digital goods can be provided without limitation. The usage number limiting URL coupon may be a single-use URL coupon which is used only once and then wasted if the predetermined number is 1.

The digital goods managing server 110 may transmit the URL coupon issuance information to the URL coupon managing server 120 via the communication unit 140. Alternatively, the URL coupon issuance information may be recorded on a recording medium, and be delivered offline, or may be delivered verbally. That is to say, the URL coupon issuance information may be delivered in a method other than computer communication.

Upon receiving the URL coupon issuance information, the URL coupon managing server 120 generates a digital goods provision URL containing the information on digital goods (Step 220). The information on digital goods is the information used in providing digital goods to a user and may contain a part of the URL coupon issuance information. The information contained in a URL coupon, such as the information on digital goods or the like, may be encrypted for security purpose by an encryption algorithm such as AES, DES, or SEED.

The URL coupon managing server 120 generates a URL coupon which contains the digital goods provision URL (Step 230). If the generation of the URL coupon is performed at the side of the URL coupon managing server 120 in this way, the side of the digital goods managing server 110 may merely make a decision on the kind of a coupon to be issued and need not develop or manage an extra system. This enables a small company or a medium-sized business entity, which lacks a security-related technique or funds, to issue coupons with ease.

The URL coupon may be a markup language element containing the digital goods provision URL, for example, the following HTML tag block.

```
<a href="http://www.testntservice.com/
linpon.php?linponid=a~1S$dSZK;mIkBKv9823?*1029@xzX!=
as?23x-0%csh0E1C+1h~sPOo2B=+a23df#?" title="
zzayo farm story" target="_blank">
    <img id= http://demo.testntservice.com/images/
linpon_normal.jpg src="http://demo.testntservice.com
/images/linpon_normal.jpg"style="">
```

The URL coupon may have other similar forms or may be simply a digital goods provision URL per se.

The URL coupon managing server 120 provides the generated URL coupon to a user 200 (Step 240). For example, the URL coupon managing server 120 may deliver the URL coupon to the user 200 by an email or a text message. In this case, the URL coupon managing server 120 may provide the URL coupon in response to a user's URL coupon provision request (e.g., a user's URL coupon purchase) or may unilaterally provide the URL coupon without receiving a user's request (For example, the URL coupon managing server 120 may distribute the URL coupon for free).

Figure 4:
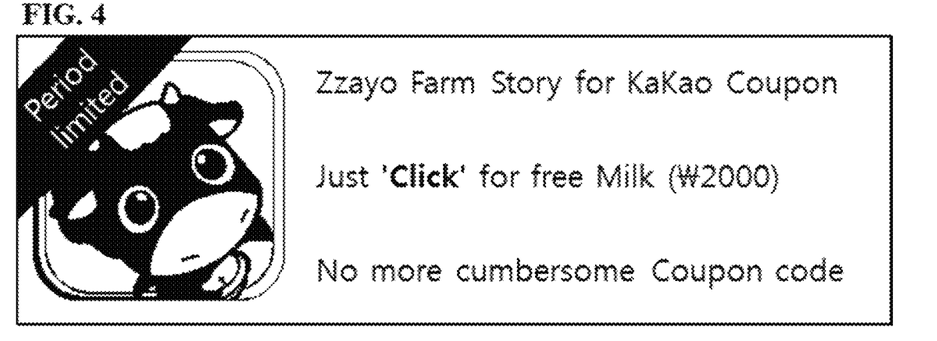
FIG. 4 is an example of a URL coupon.

If the user 200 transmits a digital goods provision request to the URL of the URL coupon, the URL coupon managing server 120 receives the request via the communication unit 140 (Step 250). For example, if the URL coupon is the aforementioned HTML tag block, the URL coupon illustrated in FIG. 4 may be displayed in a user's web browser. By clicking the URL coupon thus displayed, the user 200 may transmit digital goods provision request to the URL coupon managing server 120.

Upon receiving the digital goods provision request, the URL coupon managing server 120 may perform user authentication (Step 260). The user authentication may be performed using a user ID of the digital goods managing server 110 or a user ID of the URL coupon managing server 120 itself, or may be performed using a user ID of a third party such as a social network service. In particular, if the user authentication is performed using a user ID of a widely-available social network service such as Facebook, the user 200 may not go through a cumbersome subscription procedure when using the URL coupon, and the user 200 may first use the URL coupon prior to contacting the digital goods managing server 110 and may receive the digital goods by contacting the digital goods managing server 110 later.

Upon completing the user authentication, the URL coupon managing server 120 transmits an information processing request containing the authenticated user information and the digital goods identification information to the digital goods managing server 110 via the communication unit 160 (Step 270). Upon receiving the information processing request, the digital goods managing server 110 provides the digital goods to the user 200 (Step 280). The provision of the digital goods may be an internal execution of the information processing on the user account within the digital goods managing server 110 or may be the actual delivery of the digital goods to the user 200.

In an embodiment, the URL coupon managing server 120 may store the identification information of the generated URL coupon. Upon receiving the digital goods provision request, the URL coupon managing server 120 may compare the digital goods provision request with the stored identification information of the URL coupon stored, thereby determining whether the received digital goods provision request is a normal request. This makes it possible to enhance security.

Use of the URL coupon according to the present disclosure makes it unnecessary for the user to directly recognize and input a coupon code. Thus, it becomes quite easy to use the coupon. More specifically, in order to use a conventional coupon, the user needs to visually recognize a coupon code. The user needs to find and visit a designated application or a website and to accurately input a coupon code manually. In case of using a restricted input/output device such as a mobile device or the like, it is difficult to simultaneously observe the coupon code of the coupon held by the user and the application into which the coupon code is to be input, or to switch the applications. In contrast, in the case of the URL coupon, according to the present disclosure, all the procedures are automatically performed if the user merely clicks a link. In addition, it is not necessary for the server side to develop an additional means (a GUI, etc.) which enables the user to input a coupon code.

Moreover, a conventional coupon code is usually formed of alphabets and numerals or numerals alone (e.g., ASLK-1223-1LKJ-SDF8). Also, it is inappropriate to use confusable characters such as a capital I, a small letter l(L), a numeral 0, an alphabet O or the like. It is also difficult to use capitals and small letters in a distinguishable manner. As the number of usable characters becomes smaller, the length of a coupon code grows larger. However, for the sake of user's recognition and input convenience, it is not advisable to increase the length of a coupon code. That is to say, a conventional coupon code has a limit in the degree of complexity such as usable characters and a usable code length. This makes it impossible to use a highly-secure encryption algorithm, and there is no choice but to use a pattern method which is low in security. Consequently, a coupon issuer has a burden of developing and managing an additional pattern algorithm. It is very inconvenient for a user to manually input a coupon code even in this limited form. Since the security of a coupon code is low, it is often the case that a hacker finds out a pattern rule, and manufactures and distributes an automatic coupon code generator.

In contrast, the URL coupon according to the present disclosure makes it unnecessary for a user to directly recognize and input a coupon code and, therefore, may have long and complex characters (e.g., a~1S$dSZK; mIkBKv9823?*1029@xzX!=as?23x-0%csh0E1C+1h~sPOo2B=+a23df#?). Accordingly, the URL coupon according to the present disclosure is very suitable to encryptg the content thereof with an encryption algorithm and has an advantage of high security.

While the URL coupon may have a very complex form due to the encryption as described above, an actual internal coupon value as decrypted can have a very simple pattern rule (e.g., a serial number), since the encryption algorithm stronger than the conventional patterning method is used. Accordingly, unlike the conventional coupon system, the development cost is very low and the level of development difficulty is considerably low. This provides an advantage in that even a novice developer can make a rule within a quarter of a day while maintaining high security. In particular, since a conventional coupon has a complex coupon value, it is difficult to search and inquire an attribute value of a coupon. However, since the URL coupon according to the present disclosure has a simple internal coupon value, it provides an advantage in that it is easy to set and inquire an attribute value.

Moreover, since a conventional coupon is difficult to generate in real time, it is usually necessary to issue a large number of coupons in advance. Thus, a large amount of costs is required in safely storing and managing the coupons thus issued. On the other hand, since the URL coupon according to the present disclosure has a simple internal coupon value, it is very easy to generate the URL coupon in real time. Accordingly, there is no need to store and manage a large amount of coupons at the side of the digital goods managing server 110, the URL coupon managing server 120, and the secondary distribution server 130. Thus, the cost for managing a coupon system is sharply reduced.

While descriptions have been made on a case where the digital goods managing server 110 and the URL coupon managing server 120 are separated from each other, they may be consolidated into a single server. In this case, the server, which generates the URL coupon (Step 230), may directly provide the digital goods to the user 200 in response to the user's digital goods provision request (Step 280). In an embodiment, the user authentication (Step 260) may be omitted. Also, Step 210 and Step 270 may be performed within the server or may be omitted.

Figure 3:
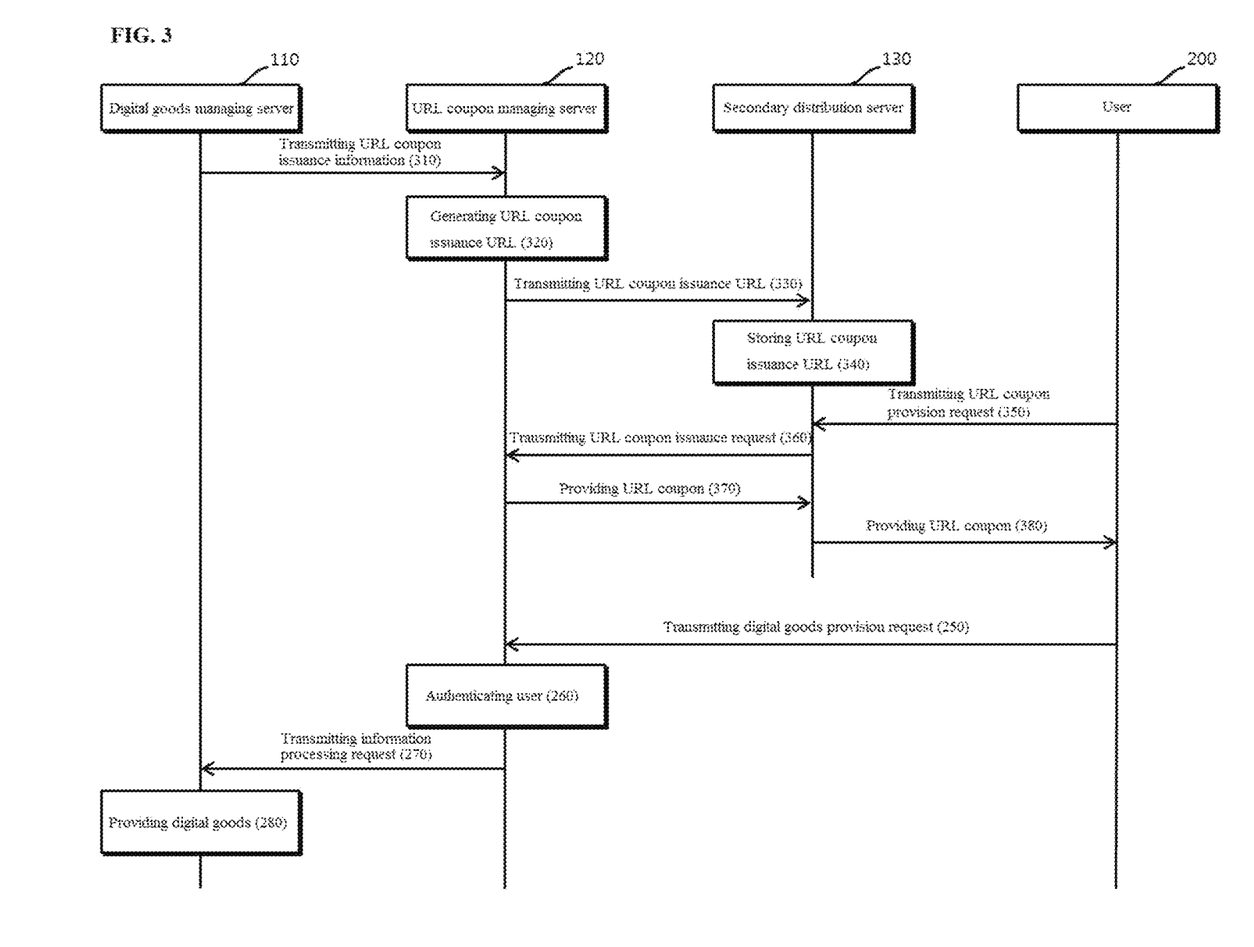
FIG. 3 is a sequence diagram schematically illustrating the flow of a method for providing digital goods using a URL coupon according to an embodiment of the present disclosure.

FIG. 3 is a sequence diagram schematically illustrating the flow of a method for providing digital goods using a URL coupon according to another embodiment of the present disclosure. FIG. 3 is directed to a case where a URL coupon is provided to a user via a secondary distributer. The secondary distributer may include various kinds of sales systems such as an Internet shopping network, a home shopping network, or a convenience store. When describing the embodiment illustrated in FIG. 3, the contents overlapping with those of the embodiment illustrated in FIG. 2 may be omitted.

Referring to FIG. 3, the URL coupon issuance information is delivered from the digital goods managing server 110 to the URL coupon managing server 120 (Step 310). The URL coupon issuance information (delivered at Step 310) may include information for generating a URL coupon issuance URL, in addition to the information described in connection with the URL coupon issuance information (delivered at Step 210) illustrated in FIG. 2. The URL coupon issuance information may be delivered by computer communication through the communication unit 140 or by an offline delivery method.

Upon receiving the URL coupon issuance information, the URL coupon managing server 120 generates a URL coupon issuance URL containing the information on the digital goods (Step 320). In an embodiment, the URL coupon issuance URL may be generated if the attribute of a coupon to 'prefab' in the URL coupon issuance information (delivered at Step 210) for generating the digital goods provision URL illustrated in FIG. 2. The information contained in the URL coupon issuance URL may be encrypted by an encryption algorithm for safety purposes. One example of the URL coupon issuance URL is as follows.

http://www.testntservice.com:17201/Linpon/Prefab/=A#+jEaB?s1-=

The URL coupon managing server 120 delivers the URL coupon issuance URL to the secondary distribution server 130 by computer communication through the communication unit 160 or by an offline delivery method (Step 330). The secondary distribution server 130 stores the URL coupon issuance URL thus received (Step 340).

If the user 200 transmits a URL coupon provision request to the secondary distribution server 130 (Step 350), the secondary distribution server 130 transmits a coupon issuance request to the URL coupon managing server 120 at the URL coupon issuance URL (Step 360). Upon receiving the coupon issuance request at the URL coupon issuance URL, the URL coupon managing server 120 transmits the URL coupon corresponding to the coupon issuance request to the secondary distribution server 130 (Step 370). In an embodiment, the URL coupon managing server 120 may enhance the security by determining whether the received coupon issuance request is received from a predefined URL of the secondary distribution server.

The generation procedure of the URL coupon is the same as described with reference to FIG. 2. Preferably, upon receiving the coupon issuance request, the URL coupon managing server 120 generates a URL coupon corresponding to the coupon issuance request in real time, and transmits the generated URL coupon to the secondary distribution server 130.In the case of a conventional coupon, if one wishes to distribute coupons via a secondary distributer, it is necessary to generate a predetermined number of coupons (e.g., 5,000 coupons) in advance, and deliver the coupons to the secondary distributer. This makes it necessary for both sides to safely store and manage a large number of coupons. However, if the URL coupon issuance URL is delivered to the secondary distribution server 130 as in the present disclosure, there is no need to generate coupons in advance. It becomes possible to generate a coupon in real time when the secondary distributer actually provides a coupon to a user. This makes it possible to significantly save the cost for coupon management.

Particularly, according to the conventional coupon issuing method, when distributing the digital goods, the following are required for the purposes of sales trace, cost calculation or the like: a considerable level of security contract between a digital goods holder and a distributer (e.g., a commission merchant); a high-level security technique; and a high-level management technique. Furthermore, a large amount of cost is generated. However, according to the present disclosure, it is enough for the secondary distributer to merely receive a URL and send a signal using the received URL. Therefore, there is no need to use an additional means for DB interoperation with a coupon issuer. It is also not necessary to use an additional programming in requesting the issuance of a coupon. This helps eliminate a development burden. There is a low possibility of an error occurrence in managing a coupon system. The coupon issuer may use various secondary distributers without an additional cost incurred by a security contract or the like.

Upon receiving the URL coupon which contains the digital goods provision URL, the secondary distribution server 130 provides the URL coupon to the user 200 (Step 380). In an embodiment, the secondary distribution server 130 may partially modify the URL coupon received from the URL coupon managing server 120 and may provide the modified URL coupon to the user 200. In another embodiment, the secondary distribution server 130 may receive information required for generation of a URL coupon such as the digital goods provision URL from the URL coupon managing server 120, or generate a URL coupon by itself, and provide the URL coupon to the user 200.

The method of using the URL coupon by the user 200 is the same as described with reference to FIG. 2. As described with reference to FIG. 2, the digital goods managing server 110 and the URL coupon managing server 120 may not be separated from each other but may be consolidated into a single server.

The aforementioned exemplary structures according to the present disclosure may be realized in different forms such as program commands executed by a processor, a software module, a micro code, a computer program product recorded in a recoding medium readable by a computer (including a device having an information processing function), logic circuits, an application-specific integrated circuit, firmware, and so forth. The examples of the computer-readable recording medium include a ROM, a RAM, a CD, a DVD, a magnetic tape, a hard disk, a floppy disk and an optical data storage device. The computer-readable recording medium may include the one realized in the form of a carrier wave (e.g., transmission through the Internet). In addition, the computer-readable recording medium may be dispersed in computer systems connected via a network. Codes readable by a computer in a dispersed manner may be stored in and executed by the computer-readable recording medium.

The present disclosure has been described in detail based on the preferred embodiments illustrated in the drawings. These embodiments are not intended to limit the present disclosure but are nothing more than examples. Thus, the present disclosure needs to be considered from an explanatory viewpoint and not from a limitative viewpoint. The genuine technical protection scope of the present disclosure shall be defined by the technical concept of the appended claims and not by the foregoing descriptions. While specific terms are used herein, these terms are used merely for the purpose of describing the concept of the present disclosure and are not used in limitative meanings to limit the scope of the present disclosure recited in the claims. Accordingly, it will be understood by a person having an ordinary knowledge in the field, to which the present disclosure pertains to, that various modifications and other equivalent embodiments may be made without departing from the scope and spirit of the present disclosure. It is to be understood that equivalents include not only the equivalents well-known at the present time but also the equivalents to be developed in future, namely all constituent elements that will be invented to perform similar functions regardless of structures.

What is claimed is:

1. A method for providing digital goods performed by a URL coupon managing server and a secondary distribution server, the method comprising:

generating, via a control unit of the URL coupon managing server, a URL coupon issuance URL that contains information identifying digital goods;

storing, via a control unit of the secondary distribution server, the URL coupon issuance URL in the secondary distribution server;

receiving, via a communication unit of the secondary distribution server, a URL coupon provision request from a user;

transmitting, via the communication unit of the secondary distribution server, a URL coupon issuance request to the URL coupon managing server at the URL coupon issuance URL;

receiving, via the communication unit of the URL coupon managing server, the URL coupon issuance request from the secondary distribution server at the URL coupon issuance URL;

generating in real time, via the control unit of the URL coupon managing server, a URL coupon that contains a digital goods provision URL containing information on the digital goods identified by the URL coupon issuance URL;

in response to the URL coupon issuance request, transmitting, via the communication unit of the URL coupon managing server, the generated URL coupon to the secondary distribution server;

transmitting, via the communication unit of the secondary distribution server, the URL coupon to the user;

receiving, via the communication unit of the URL coupon managing server, a digital goods provision request from the user at the digital goods provision URL selected by the user, without receiving coupon code input by the user; and authenticating, via the control unit of the URL coupon managing server, the user, and transmitting, via the communication unit of the URL coupon managing server, an information processing request having digital goods identification information and information regarding the authenticated user to a digital goods managing server to request the digital goods managing server to provide the digital goods identified by the digital goods provision URL.

2. The method of claim 1, further comprising:

storing, via the control unit of the URL coupon managing server, identification information of the URL coupon in a storage medium;

comparing, via the control unit of the URL coupon managing server, the received digital goods provision request with the stored identification information of the URL coupon; and determining, via the control unit of the URL coupon managing server, whether the received digital goods provision request matches the stored identification information of the URL coupon.

3. The method of claim 1, further comprising determining, via the control unit of the URL coupon managing server, whether the URL coupon issuance request is received from a predefined URL.

4. The method of claim 1, further comprising encrypting, via the control unit of the URL coupon managing server, the information contained in the URL coupon by an encryption algorithm.

5. The method of claim 1, further comprising encrypting, via the control unit of the URL coupon managing server, the information contained in the URL coupon issuance URL by an encryption algorithm.

6. A method for providing digital goods performed by a URL coupon managing server and a secondary distribution server, the method comprising:

generating, via a control unit of the URL coupon managing server, a URL coupon issuance URL that contains information identifying digital goods;

storing, via a control unit of the secondary distribution server, the URL coupon issuance URL in the secondary distribution server;

receiving, via a communication unit of the secondary distribution server, a URL coupon provision request from a user;

transmitting, via the communication unit of the secondary distribution server, a URL coupon issuance request to the URL coupon managing server at the URL coupon issuance URL;

receiving, via the communication unit of the URL coupon managing server, the URL coupon issuance request from the secondary distribution server at the URL coupon issuance URL;

generating in real time, via the control unit of the URL coupon managing server, a URL coupon that contains a digital goods provision URL containing information on the digital goods identified by the URL coupon issuance URL;

in response to the URL coupon issuance request, transmitting, via the communication unit of the URL coupon managing server, the generated URL coupon to the secondary distribution server;

transmitting, via the communication unit of the secondary distribution server, the URL coupon to the user;

receiving, via the communication unit of the URL coupon managing server, a digital goods provision request from the user at the digital goods provision URL selected by the user, without receiving coupon code input by the user; and in response to the digital goods provision request, providing, via the control unit of the URL coupon managing server, the digital goods identified by the digital goods provision URL.

\* \* \* \* \*